United States Patent [19]

Billiet et al.

[11] Patent Number: 4,701,258
[45] Date of Patent: Oct. 20, 1987

[54] FILTER HOUSINGS

[75] Inventors: Colin T. Billiet, Durham; David Baggett, Newcastle, both of England

[73] Assignee: Domnick Hunter Filters Limited, Durham, England

[21] Appl. No.: 873,622

[22] Filed: Jun. 12, 1986

[30] Foreign Application Priority Data

Jun. 13, 1985 [GB] United Kingdom ................. 8515046

[51] Int. Cl.4 ............................................. B01D 35/00
[52] U.S. Cl. .................................... 210/232; 210/541; 210/542
[58] Field of Search ............... 210/232, 234, 251, 252, 210/322, 323.1, 541, 542, 249; 248/94, 1

[56] References Cited

U.S. PATENT DOCUMENTS 4,364,829 12/1982 Atkins et al. .

Primary Examiner—Frank Sever
Attorney, Agent, or Firm—Henry Sternberg; Bert J. Lewen

[57] ABSTRACT

A filter housing comprises a body (1) designed to provide at least one flow path (8) therein. A filter may be secured to the body in operative connection with the flow path. The flow path opens into a substantially planar external face (9) of the body, and behind that external face the body is formed with passages (15a) lying one to each side of the opening, each passage having an internal wedge face facing away from the external face (9) and lying in a plane that makes an acute angle with the plane of the external face. When two such housings are placed with their planar external faces one in contact with the other and with their flow paths in axial alignment, they may be connected together by drawing wedge members (20) into the passages of the respective housings to draw the housings tightly together.

5 Claims, 4 Drawing Figures

FILTER HOUSINGS

This invention relates to filter housings.

Bowl-type filters generally have a housing at the top thereof, to which a bowl housing the filter element or elements is connected by way of a screw thread. There is often a requirement for two such filters to be mounted side by side with flow being first through one of the filters and then through the other, and accordingly some types of housing are made so that one may be bolted to the other in such a manner as to hold them securely together and to define a fluid flow path therebetween. This securing has generally been effected by two bolts, one lying to either side of the flow path, the bolts passing through the entire length of one of the housings and into tapped bores in the other housing, or passing through the entire length of both housings and being secured by nuts. In either case the housing must be provided with internal webs or other supports for the bolts, and the provision of such webs interferes with flow paths within the filter housing and can result in unwanted pressure drops.

The object of the invention is to provide a filter housing that will allow connection to an adjacent housing without the use of bolts which extend through the entire length of at least one of the housings, so avoiding the aforementioned problem.

According to the invention a filter housing comprises a body designed to provide at least one flow path therein, and means whereby a filter may be secured to the body in operative connection with the flow path, in which the flow path opens from a substantially planar external face of the body, and behind that external face the body is formed with passages lying one to each side of the opening, each passage having an internal wedge face facing away from the external face and lying in a plane that makes an acute angle with the plane of the external face.

If two such housings are placed with their planar external faces one in contact with the other, the two flow paths being in axial alignment, then they may be connected together by driving wedge members into the passages of the respective housings to draw the housings tightly together. In a first, more usual embodiment of the invention, the flow path will actually open in the plane of the external face. Desirably each housing will have a circular groove formed in the planar external face coaxial with the flow path, the groove being capable of receiving part of a sealing ring that will be sandwiched between the two housings when drawn together by the wedge action.

In a second embodiment a spigot may project from the planar external face, the flow path extending through the spigot and opening at an end thereof. The spigot may be of any suitable form, e.g, cylindrical or frusto-conical, and will be received in a correspondingly shaped recess formed in a corresponding face of a cooperating housing. Suitable sealing means may be located between the spigot and the recess.

The invention will be better understood from the following description of a specific embodiment thereof, given in conjunction with the accompanying drawings in which.

Figure 1:
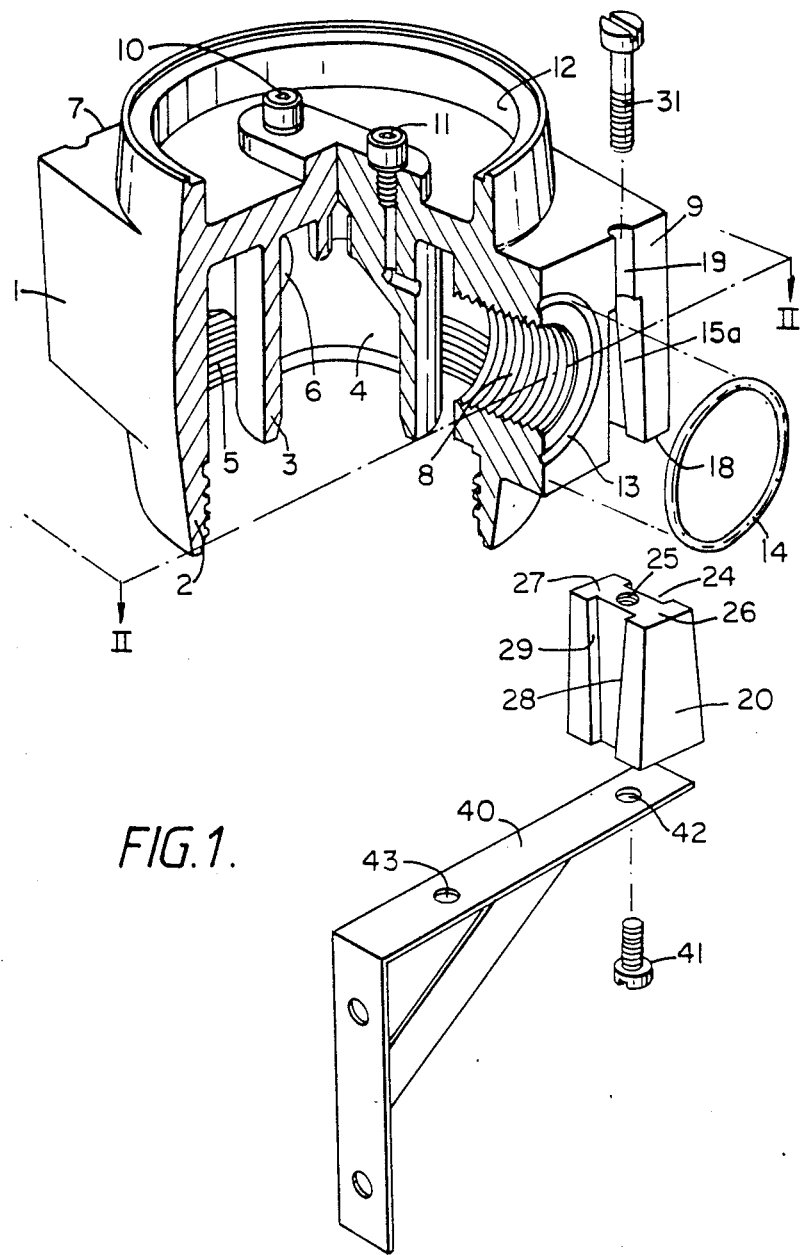
FIG. 1 shows a filter housing according to the invention partially broken away, and in conjunction with a first form of mounting bracket.

Referring to FIG. 1 this shows a housing 1 for a bowl-type filter, designed to be used in conjunction with a bowl containing a filer element, the upper end of the bowl being screwed into an internally threaded skirt 2 depending from the filter housing. The interior of the filter housing is divided by a cylindrical wall 3 into an inner chamber 4 of circular cross-section and an outer chamber 5 of annular cross-section. A first flow path 6 extends from an opening in the plane of a first planar external face of the housing 7 through the annular chamber 5 to open into the inner chamber 4. A second flow path 8 extends coaxially with the flow passage 6 from the annular chamber 5 to open in the plane of a second planar external face 9 of the body. The housing also provides for bleed passages from the chambers 4 and 5, to facilitate the mounting of a differential pressure gauge. The passages are usually closed by respective bleed screws 10 and 11 housed in a well 12 at the upper part of the housing. The well may be closed by a removable cover (not shown), part of which will be removed if a gauge is to be fitted. In a modified structure it is possible to form the upper part of the housing so that a second filter bowl may be mounted thereon.

Figure 3:
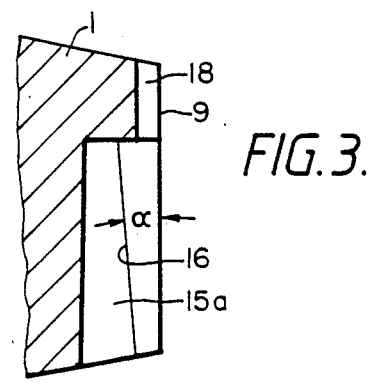
FIG. 3 is a cross-section on line III—III of FIG. 2.

Each of the planar external faces 7 and 9 of the housing body is of similar construction, and only face 9 will be described in greater detail. As already noted, the flow path 8 opens into the plane of the external face 9, and that face is formed with a circular groove 13 coaxial with the flow path 8 and capable of receiving a sealing ring 14. Behind the external face 9 the body is formed with two passages 15a, 5b, one lying to each side of the opening from the flow path 8. Each passage is of substantially T-shaped cross-section and includes an internal wedge face 16, 17 respectively facing away from the external face 9 and lying in a plane that makes an acute angle (α, FIG. 3) with that face. Each passage has a longitudinal axis that is perpendicular to the axis of the flow path, and each passage opens at its lower end into a face 18 of the housing that is perpendicular to the passage axis and to the external face 9. A groove such as 19 of semi-circular cross-section, leads from the top face of the body to the top of each respective passage 15a or 15b.

Figure 2:
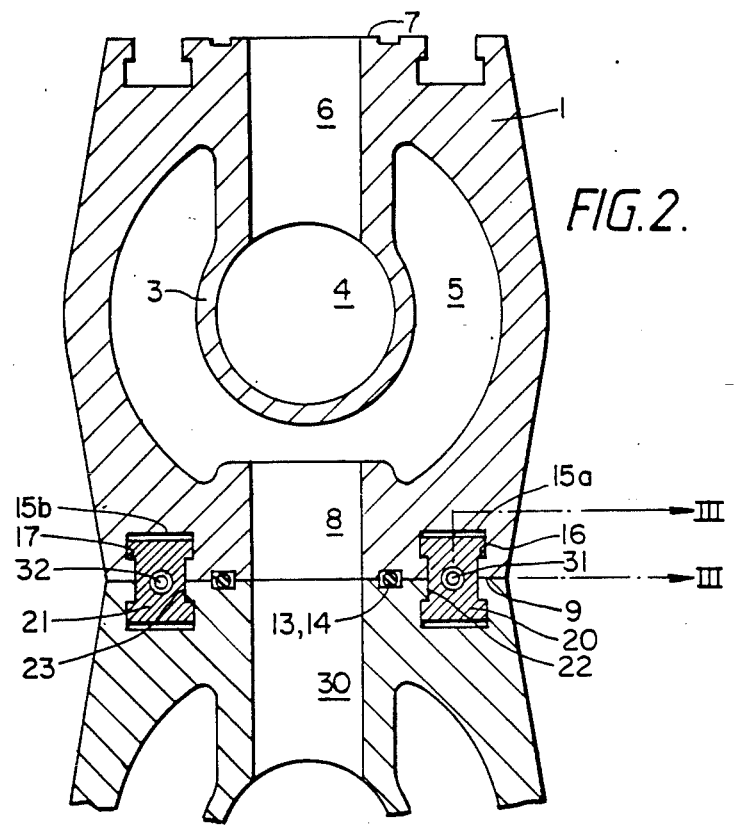
FIG. 2 shows a cross-section, generally on the line II—II of FIG. 1, showing parts of two such housings connected together.

Two housings as shown in FIG. 1 may be joined together as indicated in FIG. 2 by the use of two wedges 20, 21, one fitting into the passageway 15a and a similar passageway 22 of the second housing, and the other fitting into the passageway 15b of the body and a similar passageway 23 of the second housing. As is more clearly seen from FIG. 1 each of the wedge members comprises a central web 24 having a tapped bore 25 extending the full length thereof. At each end of the web there is a wedge element 26, 27 respectively, having wedge faces 28, 29 respectively capable of bearing on the internal wedge faces of the respective passageways. It will thus be seen that the two housings can be brought together with a sealing ring 14 located in the channel 13 and with the two flow paths 8 and 30 in axial alignment. Wedges are then inserted from the lower ends of the aligned passageways and screws 31, 32 passed down through the semi-circular channels such as 18 to engage the upper ends of the tapped bores 25 in the respective wedges. By tightening the screws the wedges are drawn upwards in the passageways, and the interaction of the wedge surfaces thus causes the two filter housings to be pulled together, so sealing one against the other with the sealing ring 14 trapped therebetween. A secure connection is thus made between the housings, with a fully sealed connection between the flow paths 8 and 30. If required, the filter housings may readily be mounted on a bracket 40 by bolts such as 41 passed through respective holes 42, 43 in the bracket and engaging the lower ends of the tapped holes 25 through the respective wedge members.

It will be seen that the wedge members form connections between the two housings that lie wholly externally of the flow paths and chambers formed in the housings and that do not interfere with fluid flow in any way whatsoever. One particularly preferred configuration of wedge faces has been particularly described, but it will be apparent that other wedge configurations could be utilised in order to produce the required effect of drawing the two planar external faces of adjacent filter housings into sealing engagement. Similarly, other orientations of the passages having the wedge faces may be utilised.

Figure 4:
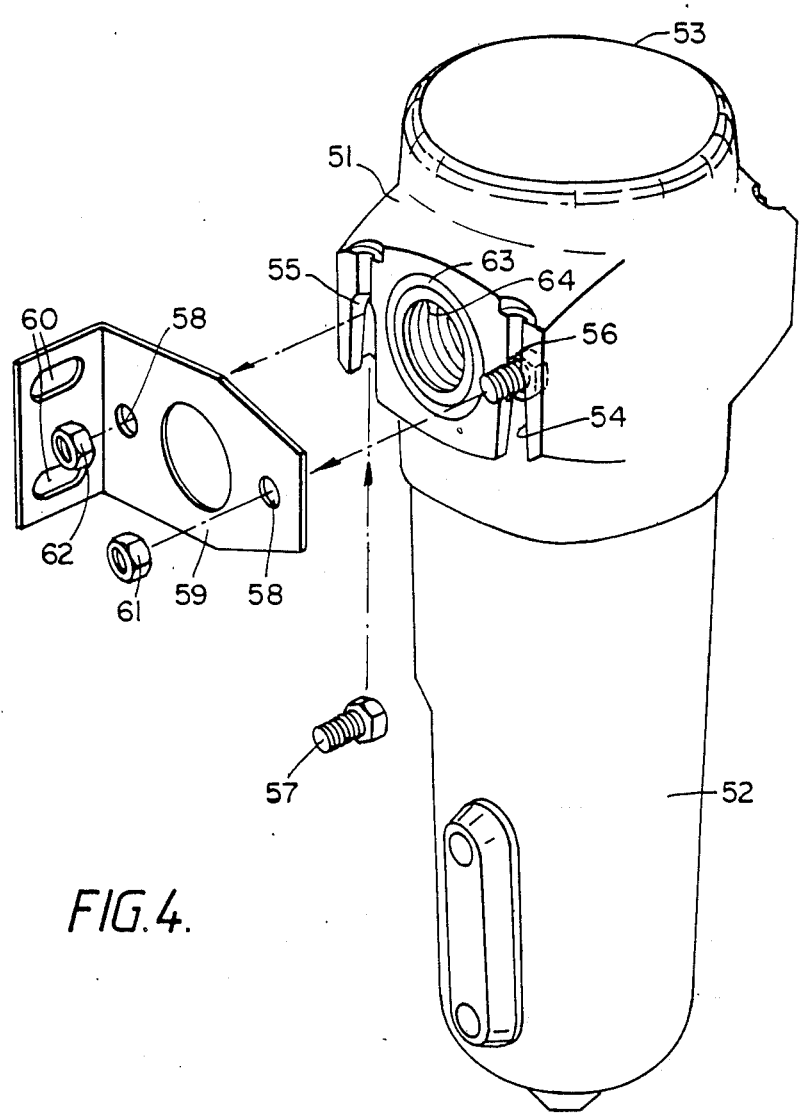
FIG. 4 shows an alternative support arrangement for a filter housing of the invention.

Referring now to FIG. 4 this illustrates an alternative form of bracket mounting. A filter housing 51 constructed substantially as shown in FIG. 1, is illustrated with a filter bowl 52 threaded thereto and with a cover plate 53 fitted over the well of the housing. The passages 54, 55 which are formed with the wedge faces each receive a bolt 56, 57 respectively, the bolts projecting through holes 58 in a bracket 59, having further holes 60 by way of which the bracket may be screwed or bolted to a support surface. Nuts 61, 62 may be tightened onto the bolts 56, 57 in order to hold the housing securely to the bracket. A hose connector may be threaded into flow path 64 to secure a hose to the housing.

Modifications of the assemblies shown will be apparent to those skilled in the art.

We claim:

1. A filter housing comprising: mean enabling connection to an adjacent structure which precludes the need for bolts which pass through the housing in interfering relationship with the flow paths within the housing, said housing including a body having at least one substantially planar external face, means in said body for providing at least one flow path, securing means on said body adapted to secure a filter to said body in operative connection with the flow path, said flow path opening from said substantially planar external face of said body, and said body being formed with a pair of passages lying behind said external face, one to each side of said opening, each said passage having an internal wedge face facing away from said external face and lying in a plane that makes an acute angle with the plane of said external face.

2. A filter housing according to claim 1 in which the external face has a circular groove formed therein coaxial with, and surrounding, the flow path, the groove having a cross-section capable of receiving part of a sealing ring.

3. A filter housing according to claim 1 in which each passage has a longitudinal axis which is perpendicular to the axis of the flow path, and each passage opens at one end thereof into a transverse face of the housing that is perpendicular to the passage axis and to the external face.

4. A filter housing according to claim 3 in which a groove of semi-circular cross-section is formed in the external face and extends from a second end of the passage to a second transverse face of the housing, the second transverse face being parallel to the first said transverse face, and the longitudinal axis of the groove being parallel to that of the passageway.

5. A pair of filter housings comprising: means enabling connection to each other which precludes the need for bolts which pass through one or both housings in interfering relationship with the flow paths within said housing, each said housing including a body having at least one substantially planar external face, means in said body for providing at least one flow path, securing means on said body adapted to secure a filter to said body in operative connection with the flow path, said flow path opening from said substantially planar external face of said body, and said body being formed with a pair of passages lying behind said external face, one to each side of said opening of said flow path in said external face, each said passage having an internal wedge face facing away from said external face and lying in a plane that makes an acute angle with the plane of said external face, said external face of each of said pair of filter housings having a circular groove formed therein co-axial with and surrounding the respective flow path and said grooves cooperating when said pair of housings are brought together adjacent one another at said external faces thereof with said openings in axial alignment with one another for forming an annular space, sealing ring means received in said space formed by said grooves, and a pair of wedge means each adapted to be received in a respective pair of opposed said passages for interacting with a corresponding pair of said wedge surfaces for causing the two filter housings to be fixed with respect to each other in face-to-face abutment with each other at said external faces thereof with said sealing ring means trapped therebetween, thereby to provide a seal around said flow path.

* * * * *